(12) United States Patent
Röhm et al.

(10) Patent No.: US 6,726,222 B2
(45) Date of Patent: Apr. 27, 2004

(54) DRILL CHUCK FOR SMOOTH- AND HEX-SHANK BITS

(75) Inventors: Günter Horst Röhm, Sontheim (DE); Hans-Dieter Mack, Sontheim (DE)

(73) Assignee: Rohm GmbH, Sontheim (DE)

( * ) Notice: Subject to any disclaimer, the term of this patent is extended or adjusted under 35 U.S.C. 154(b) by 159 days.

(21) Appl. No.: 10/189,106

(22) Filed: Jul. 3, 2002

(65) Prior Publication Data

US 2003/0155723 A1 Aug. 21, 2003

(30) Foreign Application Priority Data

Feb. 20, 2002 (DE) .......................................... 102 07 153

(51) Int. Cl.⁷ .......................... B23B 31/02; B23B 31/12; B25G 3/22
(52) U.S. Cl. ........................... 279/71; 279/79; 279/125; 408/240
(58) Field of Search ................... 279/60, 61, 62, 279/71, 79, 125, 127, 137, 157, 902; 408/239 R, 240

(56) References Cited

U.S. PATENT DOCUMENTS

| | | | | |
|---|---|---|---|---|
| 1,011,975 A | * | 12/1911 | Lewis ......................... | 279/60 |
| 1,565,227 A | * | 12/1925 | Garrison ..................... | 279/71 |
| 1,940,405 A | * | 12/1933 | Englund ...................... | 279/61 |
| 4,585,077 A | * | 4/1986 | Bergler ........................ | 173/48 |
| 4,621,818 A | * | 11/1986 | Rohm ........................ | 279/19.5 |
| 4,652,187 A | * | 3/1987 | Regelsberger et al. ....... | 408/240 |
| 4,775,159 A | * | 10/1988 | Manschitz .................. | 279/19.3 |
| 4,900,202 A | * | 2/1990 | Wienhold .................... | 408/240 |
| 5,470,084 A | * | 11/1995 | Reibetanz et al. .......... | 279/19.3 |
| 5,499,828 A | * | 3/1996 | Salpaka et al. .............. | 279/62 |
| 5,882,153 A | * | 3/1999 | Mack et al. ................. | 408/240 |
| 6,135,462 A | * | 10/2000 | Robison ..................... | 279/137 |
| 6,533,291 B2 | * | 3/2003 | Huggins et al. .............. | 279/29 |
| 6,536,782 B2 | * | 3/2003 | Röhm ......................... | 279/62 |
| 2003/0189299 A1 | * | 10/2003 | Huggins et al. ............. | 279/62 |

FOREIGN PATENT DOCUMENTS

DE 3512-130 A * 3/1985

* cited by examiner

Primary Examiner—A. L. Wellington
Assistant Examiner—Brian D. Walsh
(74) Attorney, Agent, or Firm—Herbert Dubno; Andrew Wilford

(57) ABSTRACT

A drill chuck has a chuck body centered on an axis and forming an axially forwardly open bit-receiving recess, an axially forwardly open polygonal-section seat at a base of the recess, and a plurality of jaws spaced angularly around the seat. The jaws can be displaced radially inward and outward to grip a bit in the recess. An element can move in the base of the recess between a blocking position in front of the polygonal-section seat and preventing entry of a bit thereinto and a freeing position clear of the seat and permitting entry of a bit thereinto. This element can be actuated for movement between the blocking and freeing positions either manually or automatically.

20 Claims, 14 Drawing Sheets

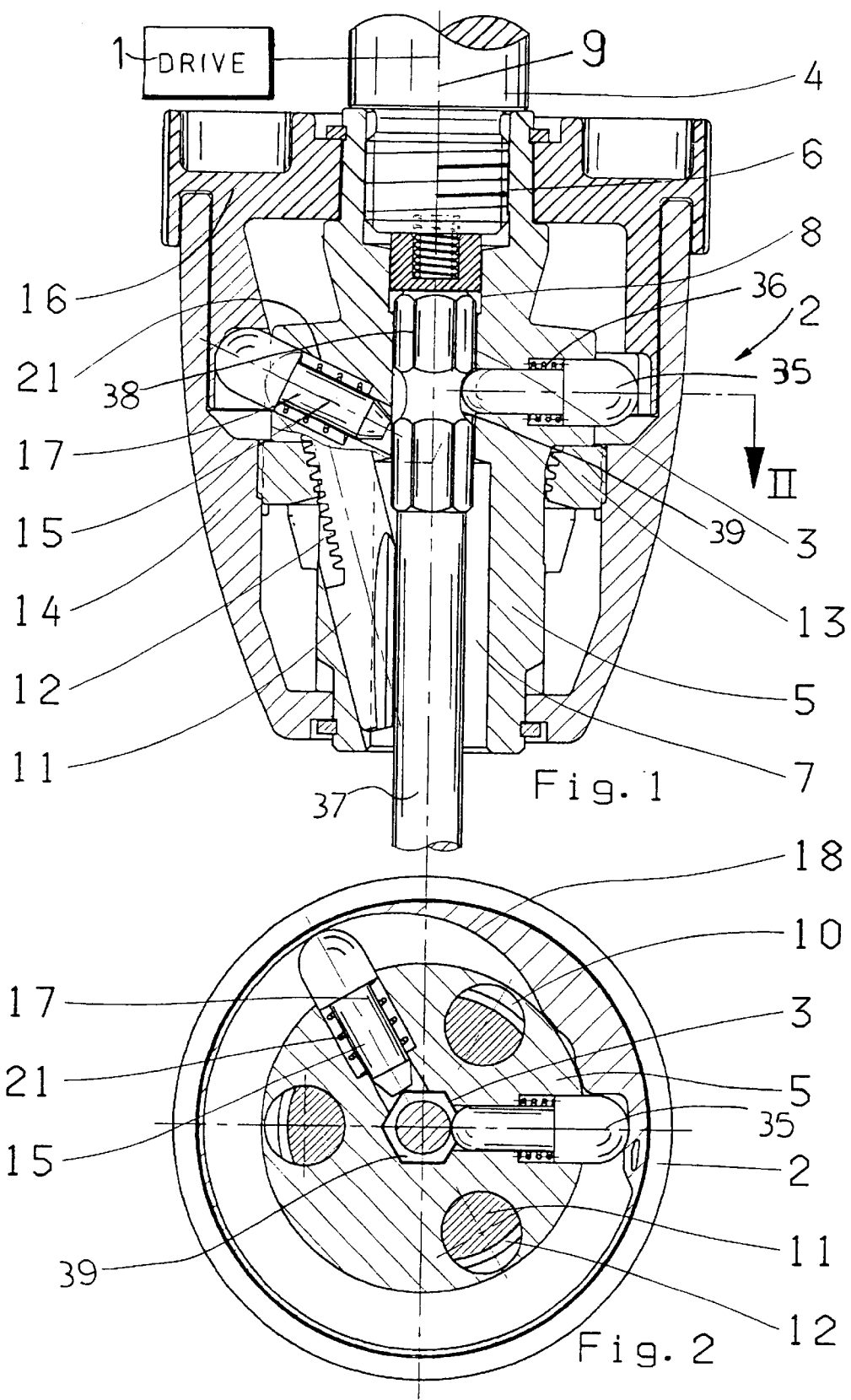

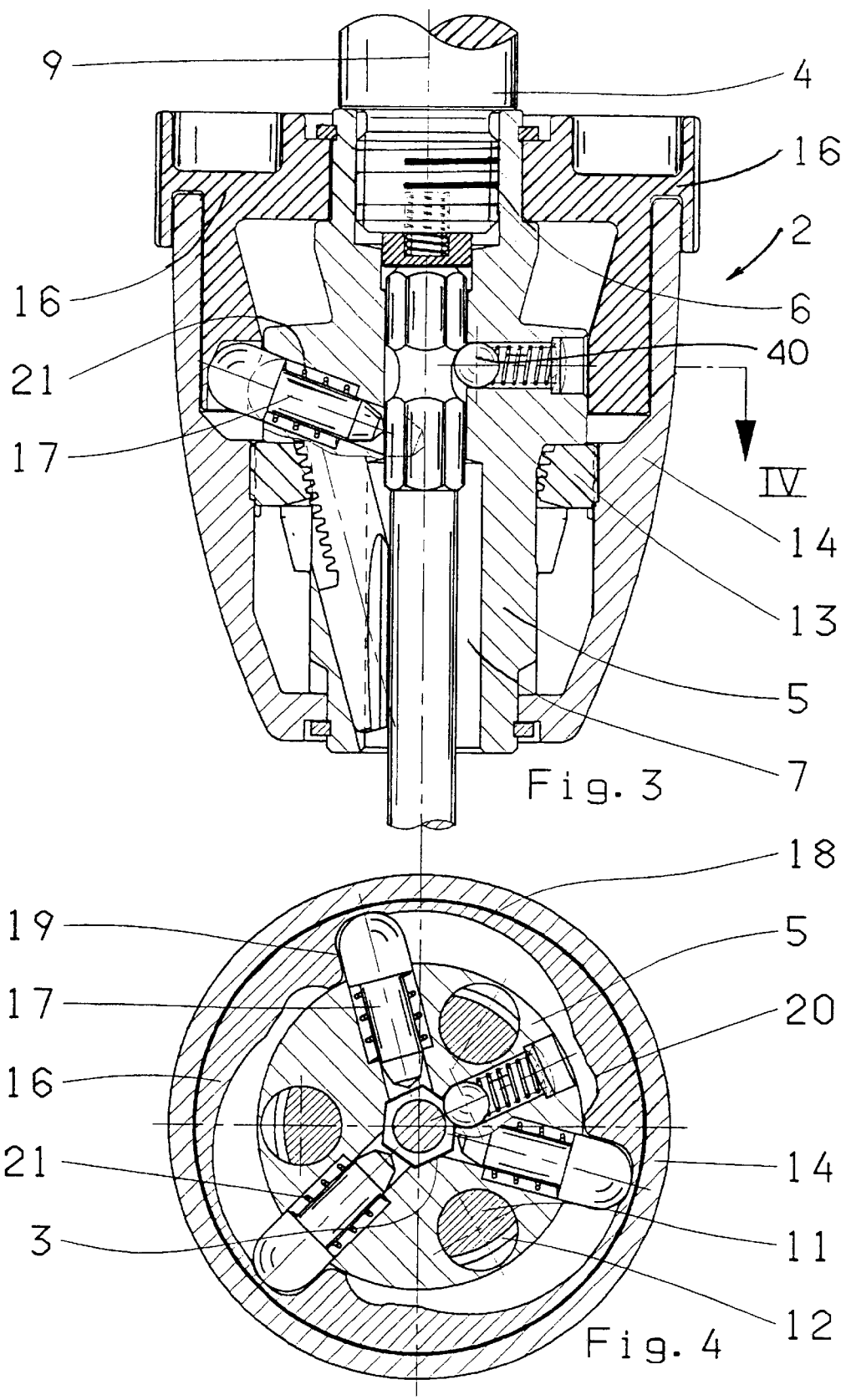

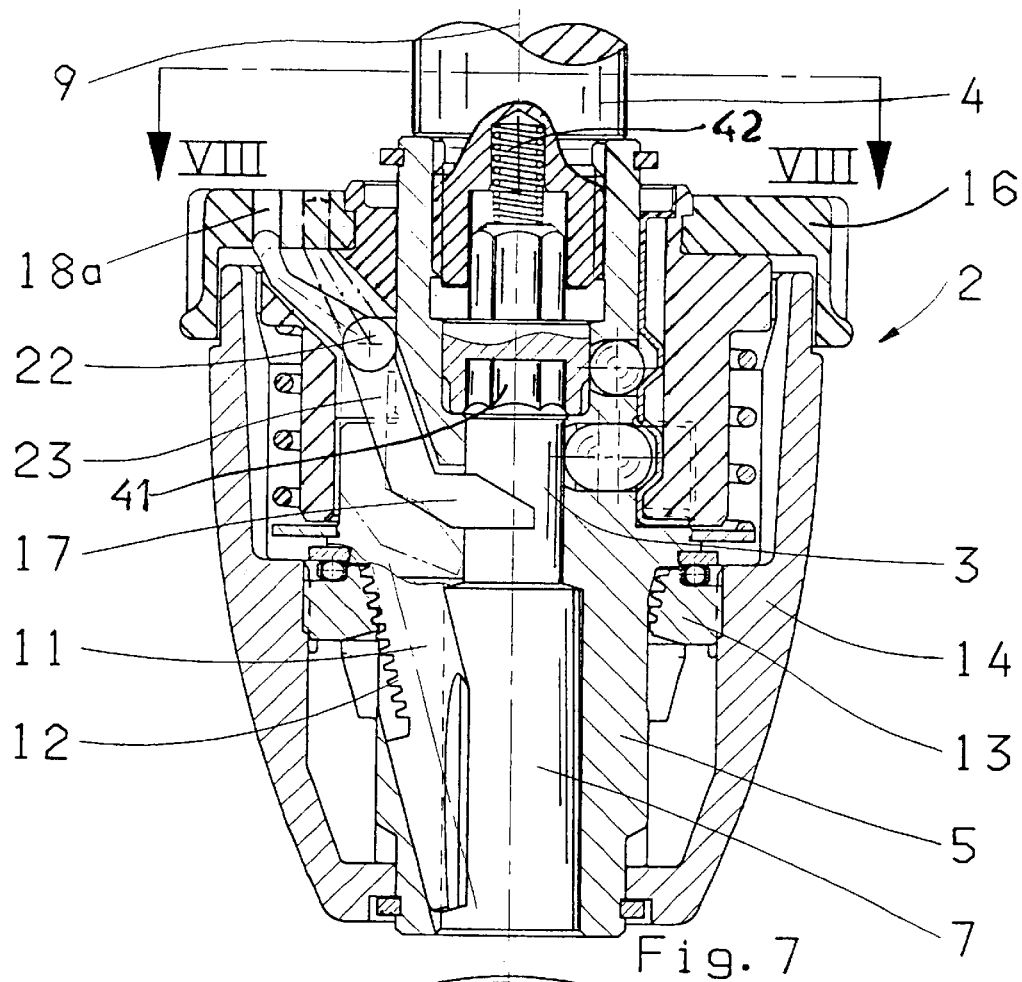
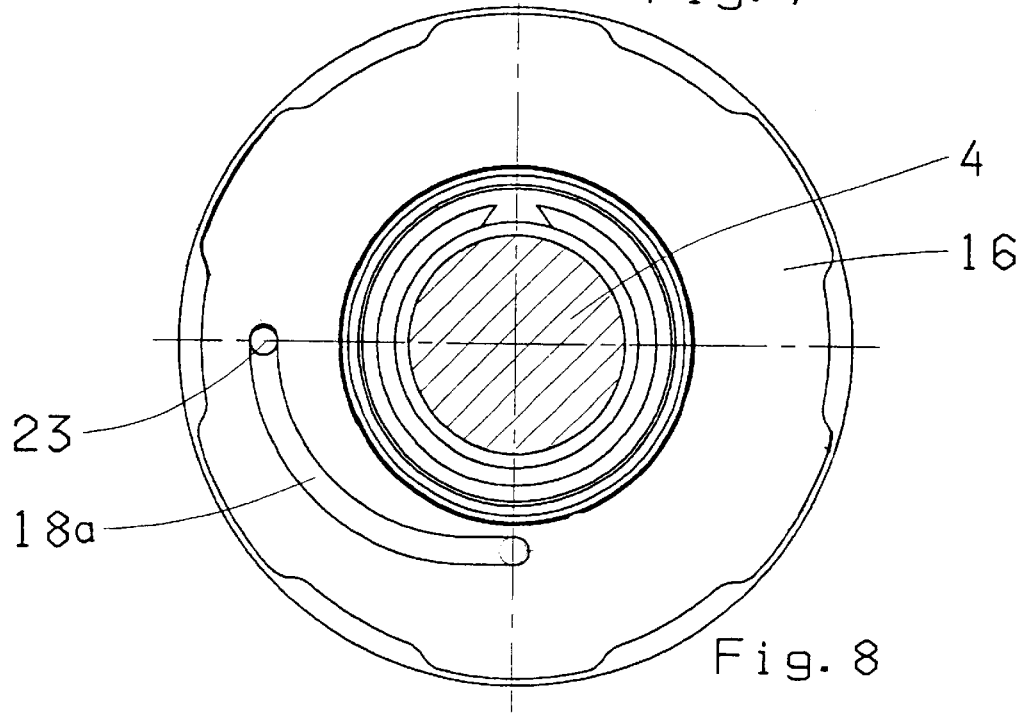

DRILL CHUCK FOR SMOOTH- AND HEX-SHANK BITS

FIELD OF THE INVENTION

The present invention relates to a drill chuck. More particularly this invention concerns such a chuck which can be used with both smooth- and hex-shank bits.

BACKGROUND OF THE INVENTION

A basic drill chuck has a chuck body centered on and rotatable about an axis and formed with an axially centered and axially forwardly open tool-receiving recess. A plurality of jaws angularly spaced about the recess can be moved axially forward and radially inward to grip a smooth-shank tool bit engaged in the recess. Normally a ring on sleeve on the chuck body is rotated to effect this jaw movement. The jaws are either carried in angled guide passages formed in the chuck body and have toothed outer edges meshing with a screwthread of the tightening ring, or are carried in angled guide passages formed in the ring and have toothed inner edges meshing with a screwthread of the chuck body.

It is also known to provide structure at the rear end of the tool recess that forms a standardized hexagonal seat that is open axially forward and that is rotationally coupled to, if not actually formed by, the chuck body. This seat has a diagonal measurement of 6.35 mm and is intended to received the similarly dimensioned hex shanks of various tools, in particular screw bits. Thus although it is possible to solidly grip a hex-shank bit in the standard three-jaw chuck, the supplemental hex seat makes it possible to more quickly mount and accurately hold a hex-shank bit. A spring-loaded retainer is provided to hold such hex-shank bits, so that they can be easily snapped into and out of the chuck.

The hex seat at the rear end of the tool recess is not a problem when the chuck is used with relatively large-diameter smooth-shank bits. The shanks of such bits cannot fit into the hex seat so the rear end of the tool sits atop this seat.

When, however, a smaller-diameter bit is being chucked, for instance one having a smooth shank smaller than 6 mm in diameter, it is possible for it to extend back into the hex seat. This is disadvantageous in that it allows the bit to fit too deeply into the chuck so that the jaws, for instance, will come into engagement with the actual cutting flute of the tool and possible damage it. Furthermore when tools of about 6 mm in diameter are being chucked, they can jam in and actually damage the hex seat.

OBJECTS OF THE INVENTION

It is therefore an object of the present invention to provide an improved chuck for hex- and smooth-shank bits.

Another object is the provision of such an improved chuck for hex- and smooth-shank bits which overcomes the above-given disadvantages, that is which protects the hex seat.

SUMMARY OF THE INVENTION

A drill chuck has according to the invention a chuck body centered on an axis and forming an axially forwardly open bit-receiving recess, an axially forwardly open polygonal-section seat at a base of the recess, and a plurality of jaws spaced angularly around the recess forward of the seat. The jaws can be displaced radially inward and outward to grip a bit in the recess. An element can move in the base of the recess between a blocking position in front of the polygonal-section seat and preventing entry of a bit thereinto and a freeing position clear of the seat and permitting entry of a bit thereinto. This element can be actuated for movement between the blocking and freeing positions either manually or automatically.

Thus with this arrangement the hex seat can be blocked to prevent a smooth-shank bit from fitting into it. This preserves the seat and the smooth-shank bits, and can even prevent large particles from lodging in the seat.

According to the invention the element is actuated by a ring rotatable about the axis on the chuck body. The element is a pin braced against the ring and generally radially displaceable in the chuck body. The ring has a cam surface against which the pin is braced and the cam surface can have one end forming a seat in which the pin is engageable in the blocking position. A spring urges the element against the surface and into the freeing position although it is possible for the pin to have a formation positively coupling it to the jaw for synchronous movement without the spring. For most efficient blocking of the seat there are a plurality of the pins angularly equispaced around the axis.

Alternately in accordance with the invention the element includes a lever pivoted about a lever axis on the chuck body. This lever can be coupled to a pin itself movable in front of the seat in the blocking position. It is also possible for the lever itself to have an end movable in front of the seat in the blocking position.

The chuck body according to the invention is formed with angled guides holding the jaws and a ring rotatable about the axis on the body has a screwthread meshing with the jaws so that rotation of the ring displaces the jaws axially and radially. One of the jaws can be formed with a cam face engageable with the lever for displacing the lever end into the blocking position on axial advance of the one jaw past a predetermined position. In another arrangement the element is a plate slidable in the chuck body transverse to the axis and formed with an aperture aligned with the seat in the freeing position. One of the jaws is formed with a cam face engageable with the plate for displacing the aperture out of alignment with the seat on axial advance of the one jaw past a predetermined position. A spring urges the plate against the face of the one jaw. The element can also be a leaf spring bearing elastically against one of the jaws and having an end displaceable in front of the seat on axial forward advance of the one jaw past a predetermined position.

One of the jaws according to the invention can have a notch in which is engageable a spring-biased element when the jaw is in a predetermined position. When this or another one of the jaws is formed with a cam surface engageable with the element to displace it between the blocking and freeing positions, this predetermined position corresponds the blocking position of the element. This gives the user the ability, when closing the chuck to feel when the blocking position is set and can serve to hold the chuck in the seat-blocked position.

The polygonal seat, which normally is hexagonal and corresponds to the standard screw bit can be formed in the chuck body or can be formed in the spindle or, more likely, in an element carried on the spindle so that hex-shank tools are actually virtually directly coupled to the power-unit spindle. The element on the spindle forming the hex shank is typically a small socket that can move axially limitedly relative to the spindle and that is biased axially forward to push the bit out.

BRIEF DESCRIPTION OF THE DRAWING

The above and other objects, features, and advantages will become more readily apparent from the following description, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing:

FIG. 1 is an axial section through a first embodiment of the chuck according to the invention;

FIG. 2 is a section taken along line II—II of FIG. 1;

FIG. 3 is a view like FIG. 1 of a second embodiment of the chuck with a bit engaged in the chuck's hex seat;

FIG. 4 is a section taken along line IV—IV of FIG. 3;

FIG. 7 is an axial section through a third embodiment of the chuck;

FIG. 8 is a section taken along line VIII—VIII of FIG. 6;

SPECIFIC DESCRIPTION

Figure 5:
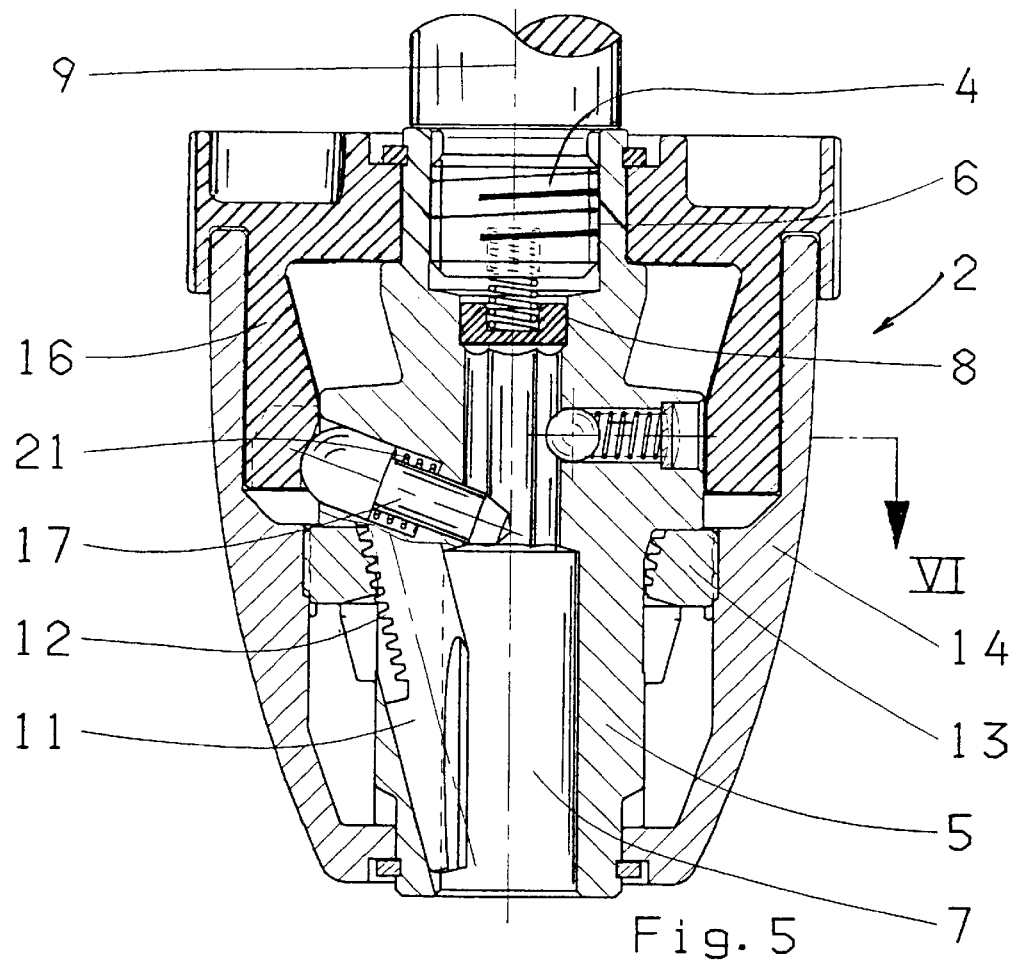
FIG. 5 is a view of the chuck of FIG. 3, but in the seat-blocked position.

As seen in FIGS. 1 and 2 a drive unit 1 having a spindle 4 centered on an axis 9 carries a chuck 2 having a body 5 formed with an axially rearwardly open threaded bore 6 to which the spindle 4 is fitted. Here the chuck body 5 forms a rear forwardly open hex-section seat 3 of standard dimensions and a front forwardly open tool recess 7 that are both centered on the axis 9. A passage 8 axially interconnects the seat 3 and bore 6.

Three angularly equispaced jaws 11 are received in guide passages 10 formed in the body 5 and have outer edges formed with teeth 12 meshing with a ring 13 fixed in a tightening sleeve 14 that is rotatable but not axially displaceable on the body 5. Thus rotation of the sleeve 14 in one direction moves the jaws 11 forward and together to grip a shank of a tool in the recess 7, and opposite rotation spreads them. It is within the scope of the invention to provided the guides 10 on the sleeve 13 and have the teeth 12 mesh with a screwthread on the body 5 for the same effect.

In accordance with the invention a blocking system 15 is provided for preventing a tool shank from extending back into the seat 3. In FIGS. 1 and 2 this system 15 comprises a generally radially displaceable pin 17 that is urged radially outward by a spring 21 but that can be displaced radially inward by a cam surface 18 formed in a ring 16 rotatable but axially fixed on the body 5 and exposed rearward of the tightening sleeve 14. Alternately the outer end of the blocking pin 17 could be formed as a dovetail and fit in a complementary groove in the surface 18 so that, without the spring 21, the pin 17 can be retracted by the ring 16.

The cam surface 18 also engages a radially displaceable retaining pin 35 urged radially outward by a spring 36 and engageable in a radially outwardly open groove 39 formed in the hex-section rear end 38 of a bit 37. Thus in the illustrated one angular end position of the ring 16 the pin 35 is pressed radially into the groove 39 and the other pin 17 is retracted out of the seat 3. In an opposite unillustrated end position the pin 17 is pressed radially inward to block the mouth of the seat 3 and the other pin 35 is in a radial outer position.

Figure 6:
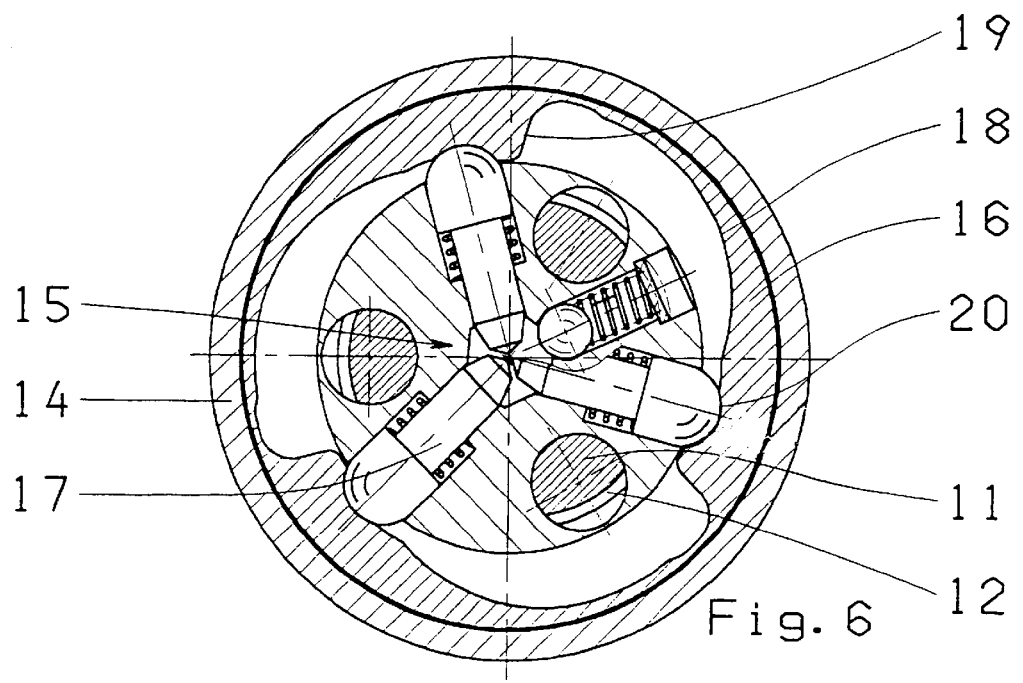
FIG. 6 is a section taken along line VI—VI of FIG. 5.

The system of FIGS. 3 through 6 is identical to that of FIG. 1 except that there are three of the blocking pins 17 each operated by a respective part of the surface 18. In addition here the bit-retaining pin 35 is replaced with a spring-loaded ball 40. Each section of the cam surface 18 has a seat 20 in which the outer ends of the pins 17 sit when they are pressed radially inward as shown in FIGS. 5 and 6. When in the outer freeing position of FIGS. 3 and 4 they fit against end flanks or faces 19 of the sections of the cam surface 18.

Figure 9:
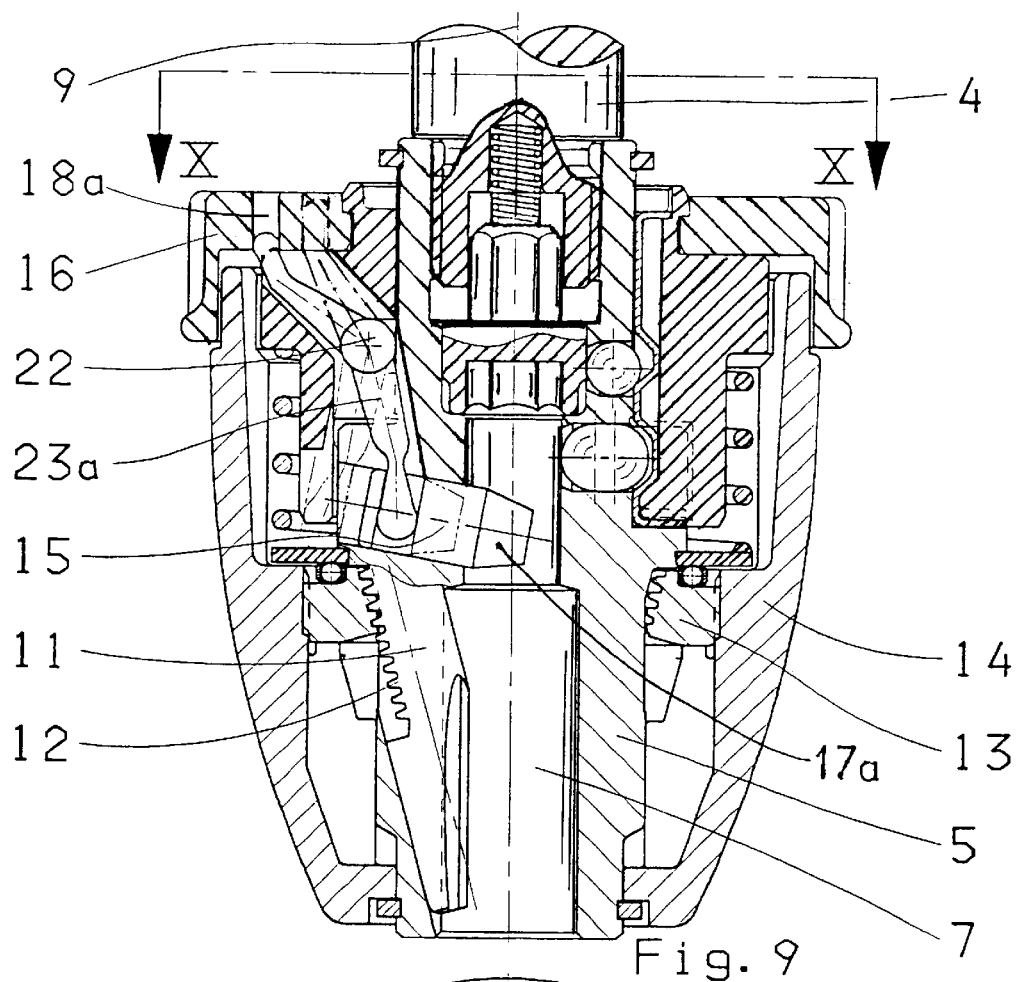
FIG. 9 is an axial section through a fourth embodiment of the chuck.
Figure 10:
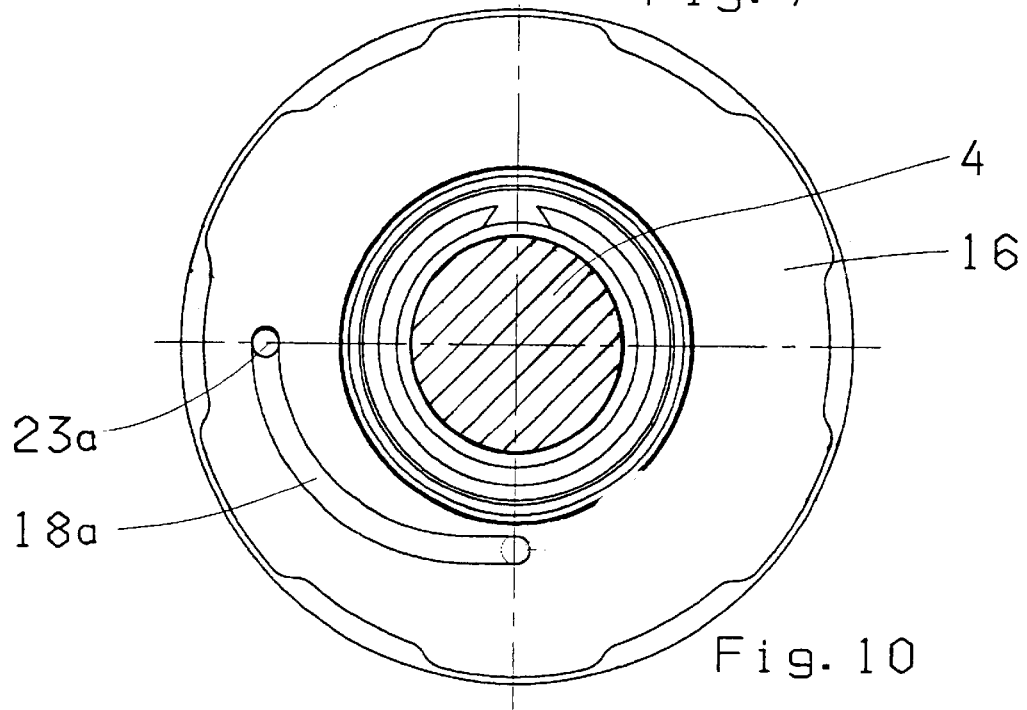
FIG. 10 is a section taken along line X—X of FIG. 9.

In the arrangement of FIGS. 7 and 8 a lever 23 pivoted about an axis 22 extending tangentially in the body 5 replaces the blocking pin(s) 17. The rear end of this lever 23 fits in a cam groove 18a formed n the ring 16 and the front end can move radially between an illustrated inner position blocking the seat 3 and an outer freeing position shown in dot-dash lines. In FIGS. 9 and 10 a similar lever 23a radially displaces a blocking pin 17a for the same effect. Here an element 41 fixed rotationally to the front end of the shaft 4 forms the seat 3. A spring 42 urge the spring element 41 axially forward.

Figure 11:
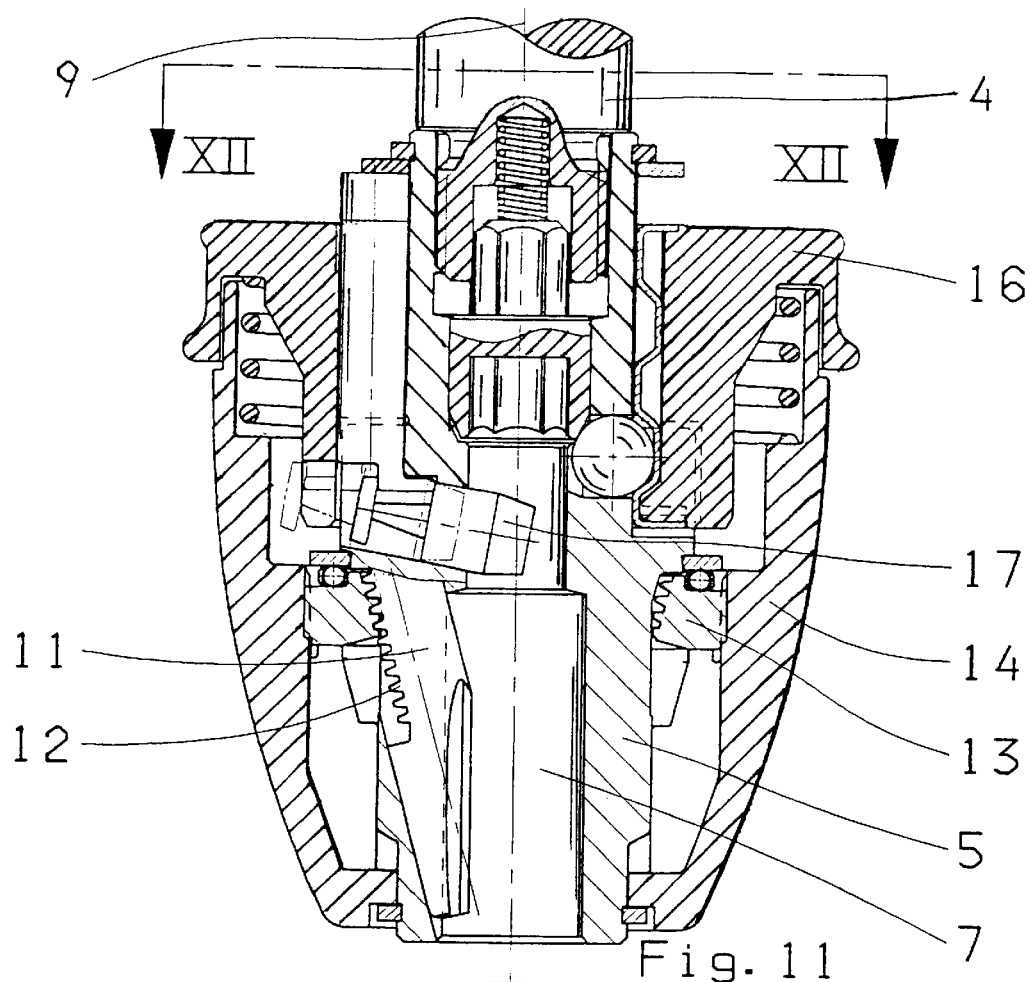
FIG. 11 is an axial section through a fifth embodiment of the chuck.
Figure 12:
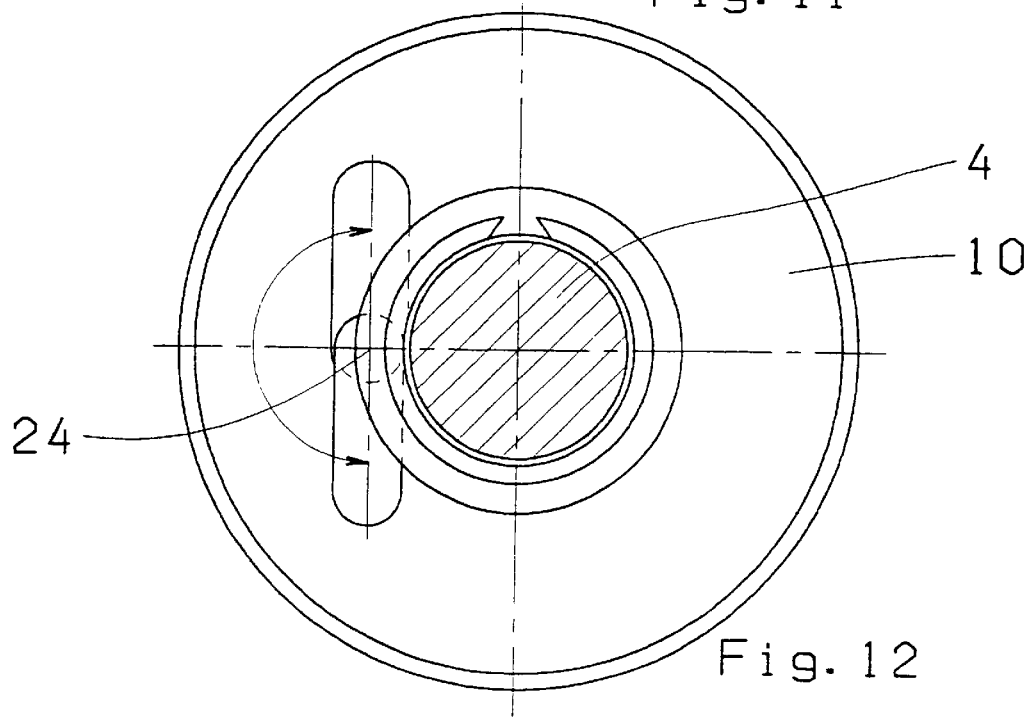
FIG. 12 is a section taken along line XII—XII of FIG. 11.

A similar system is used in FIGS. 11 and 12 where the lever 24 pivots about an axis parallel to the axis 9.

Figure 13:
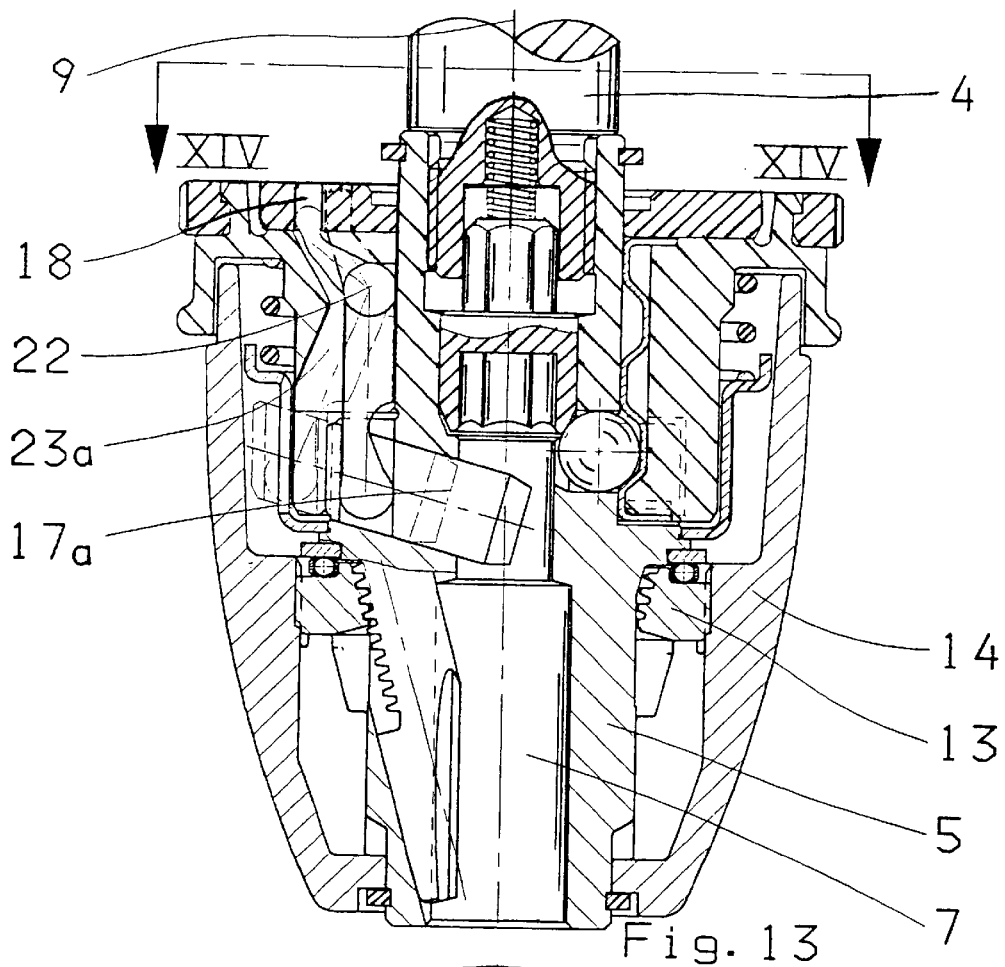
FIG. 13 is an axial section through a sixth embodiment of the chuck.
Figure 14:
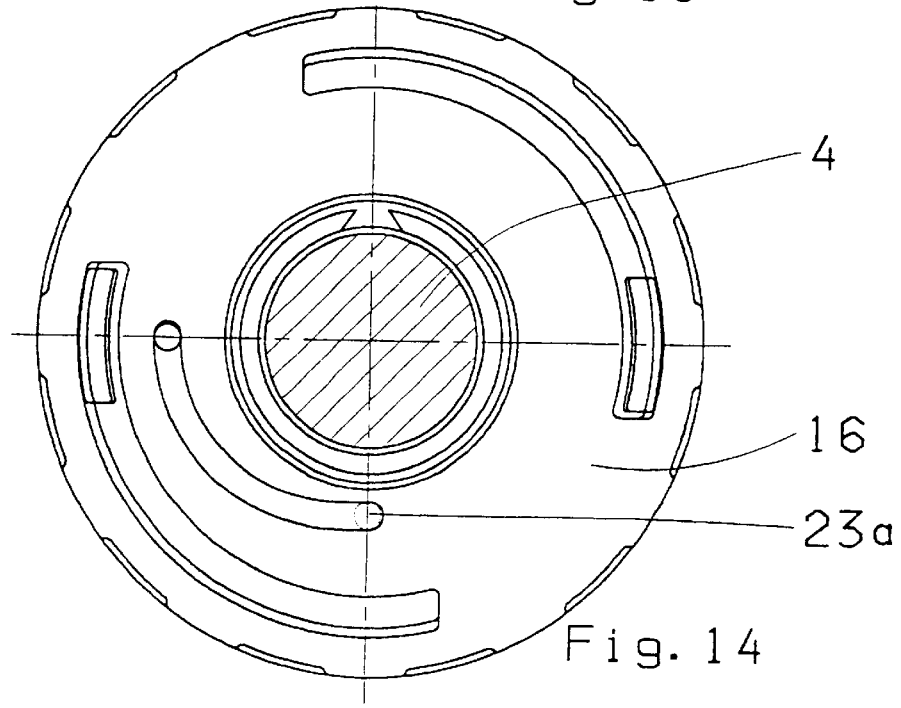
FIG. 14 is a section taken along line XIV—XIV of FIG. 13.

FIGS. 13 and 14 show a system corresponding similar to that of FIGS. 9 and 10 with minor structural differences.

Figure 15:
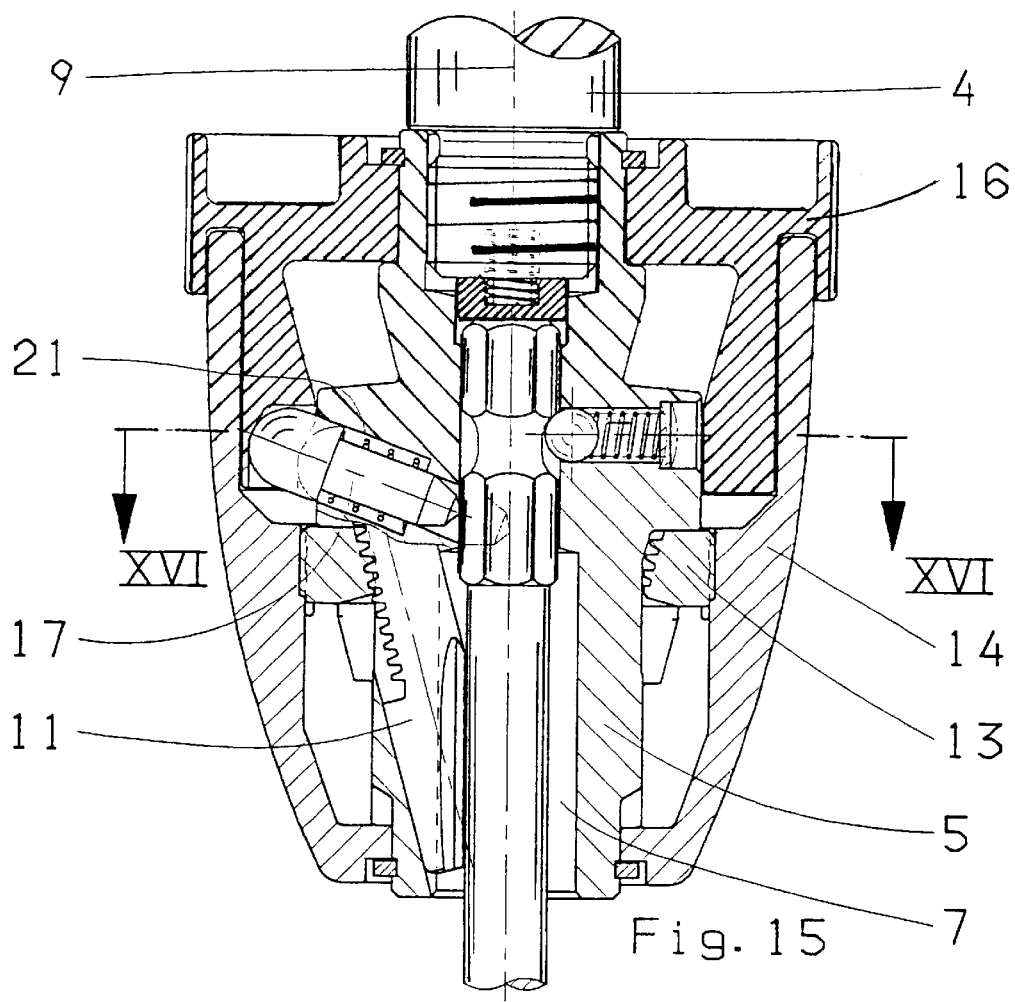
FIG. 15 is an axial section through a seventh embodiment of the chuck.
Figure 16:
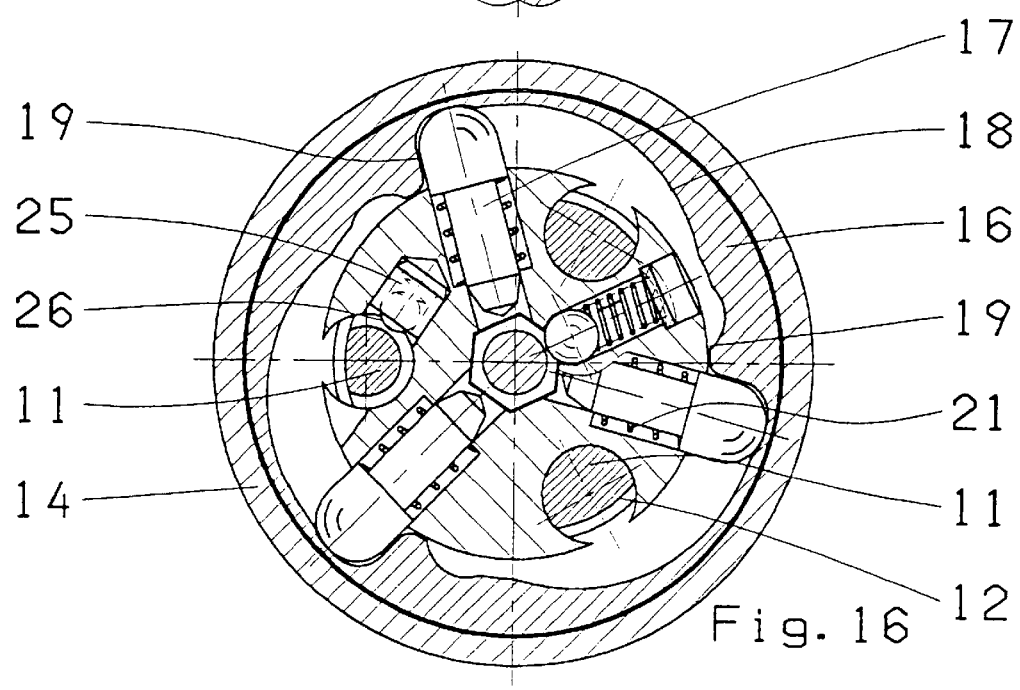
FIG. 16 is a section taken along line XVI—XVI of FIG. 15.

The system of FIGS. 15 and 16 has a spring-loaded element 25 that can engage transversely into a notch or seat 26 formed in one of the jaws 11 to provide sensory feedback when the jaws 11 are retracted enough to clear the seat 3 and the seat 3 is blocked.

Figure 17:
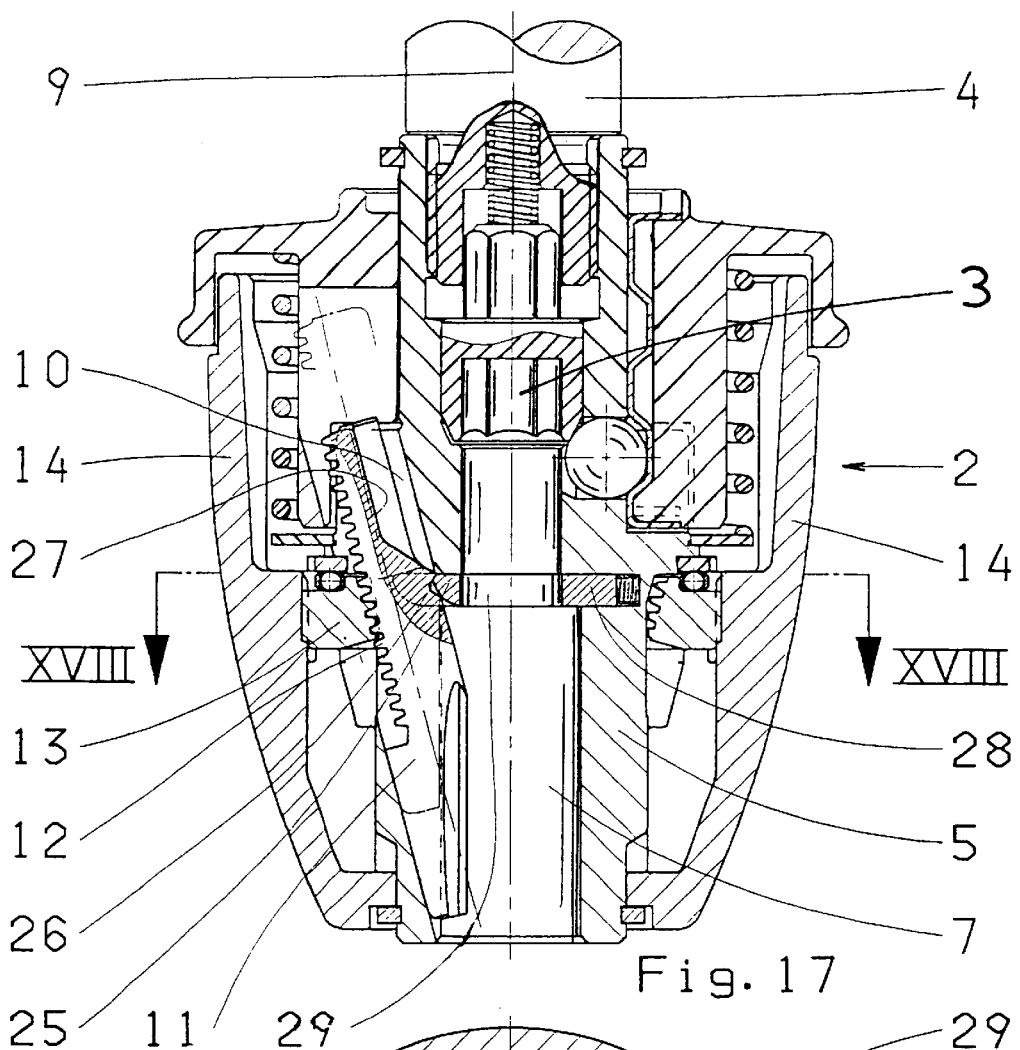
FIG. 17 is an axial section through an eighth embodiment of the chuck.
Figure 18:
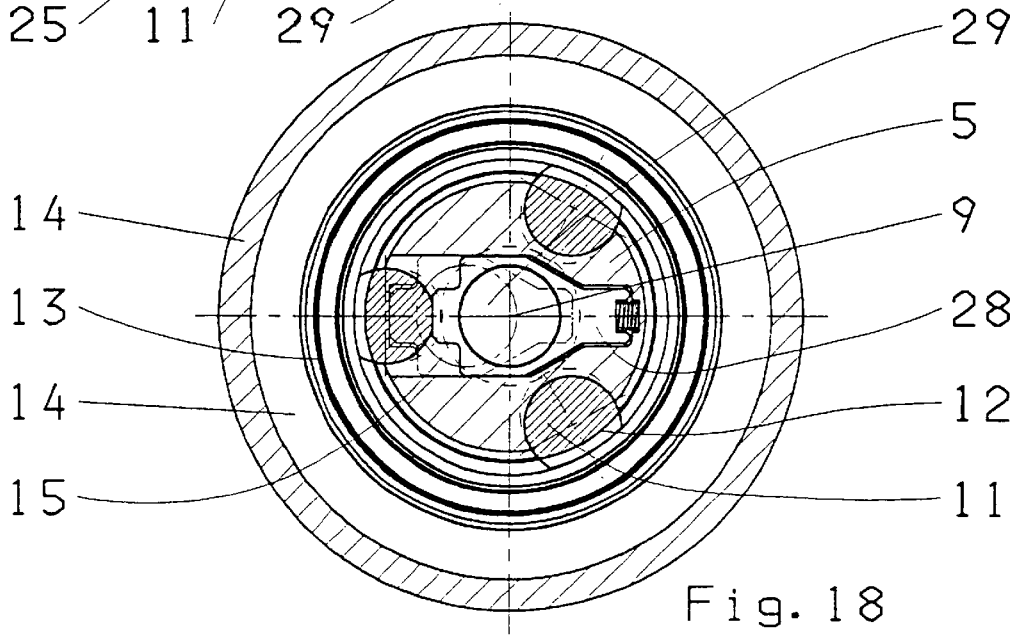
FIG. 18 is a section taken along line XVIII—XVIII of FIG. 17.
Figure 19:
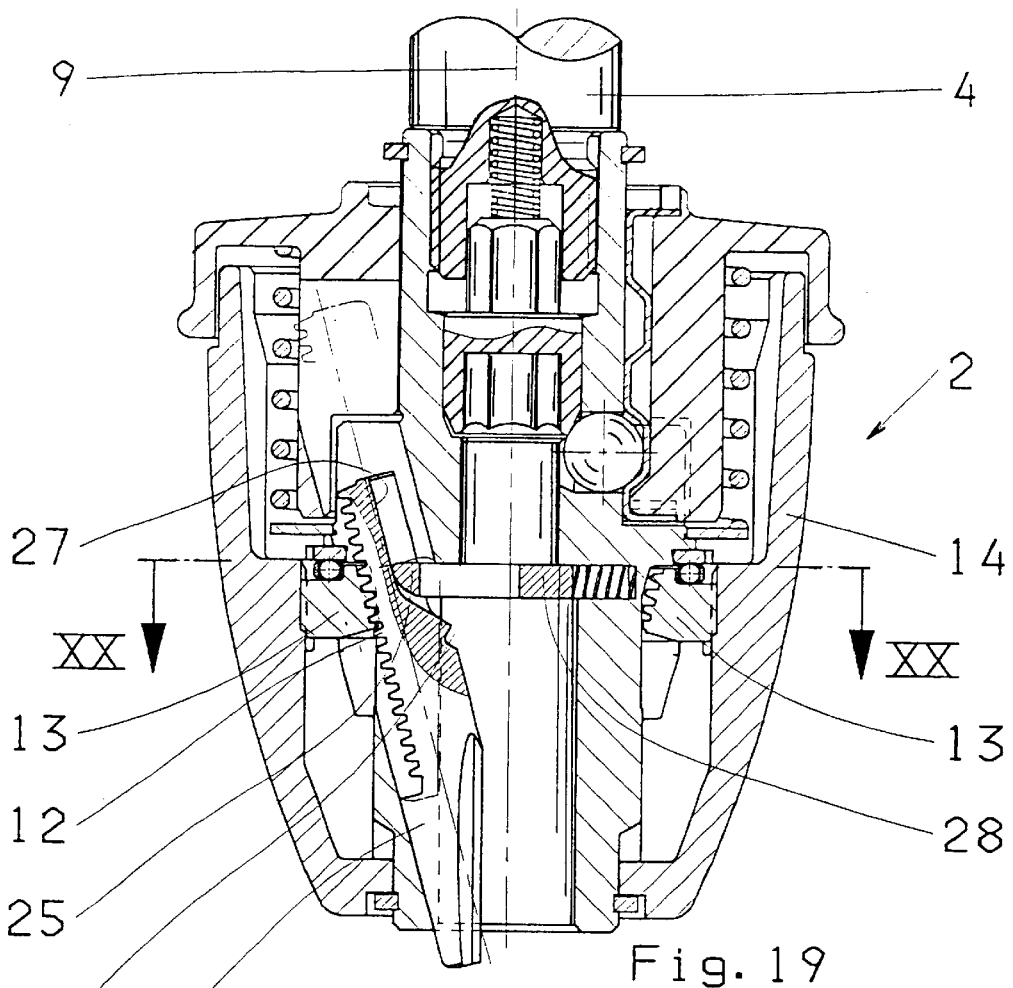
FIG. 19 is a view of the chuck of FIG. 17, but with the jaws advanced more.
Figure 20:
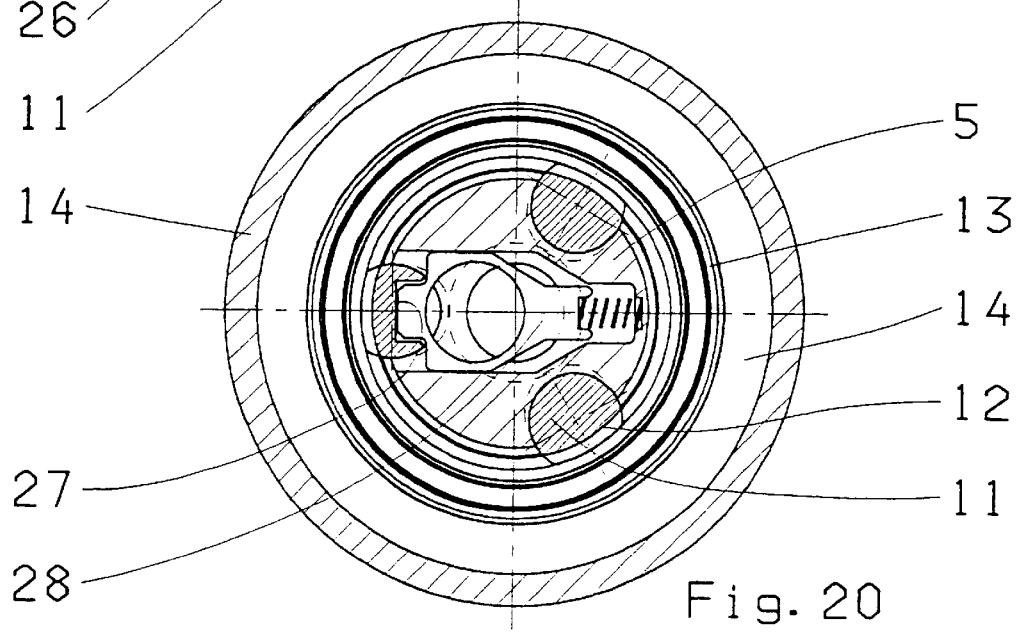
FIG. 20 is a section taken along line XX—XX of FIG. 19.
Figure 21:
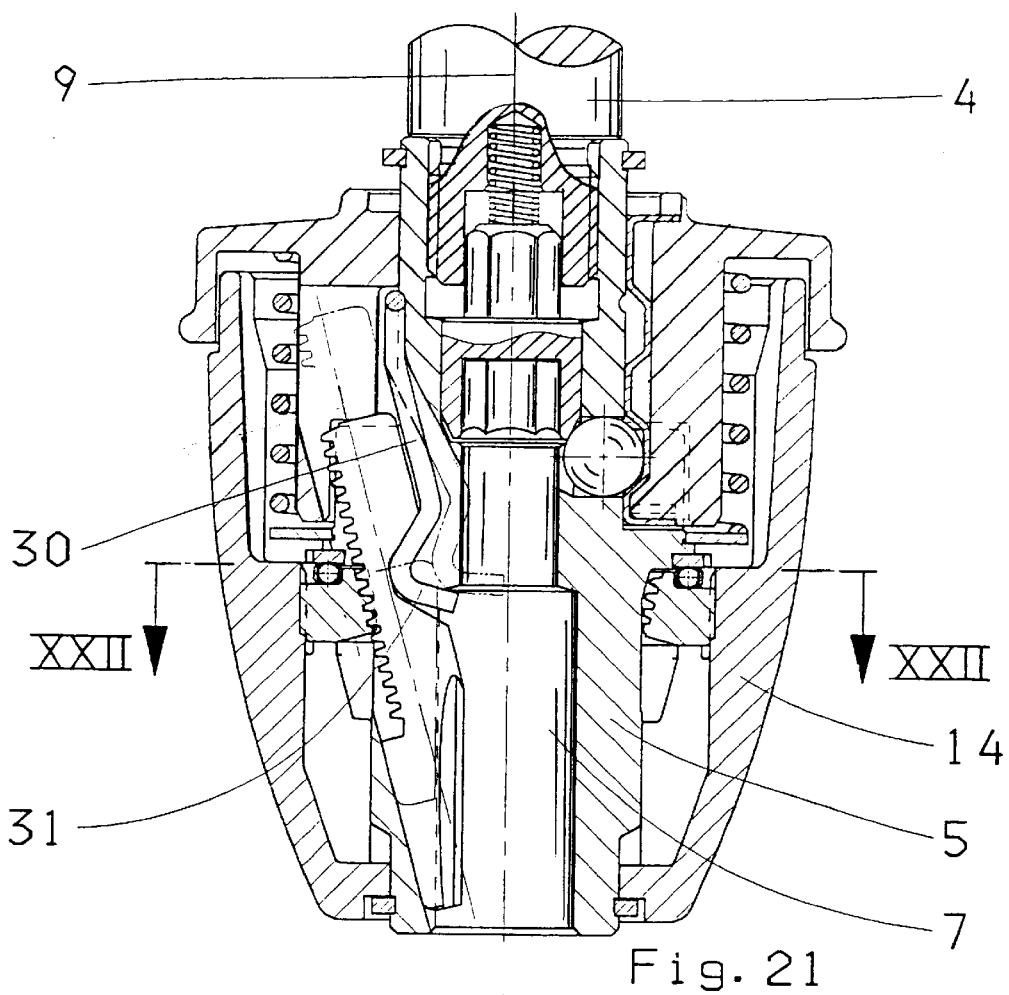
FIG. 21 is an axial section through a ninth embodiment of the chuck.
Figure 22:
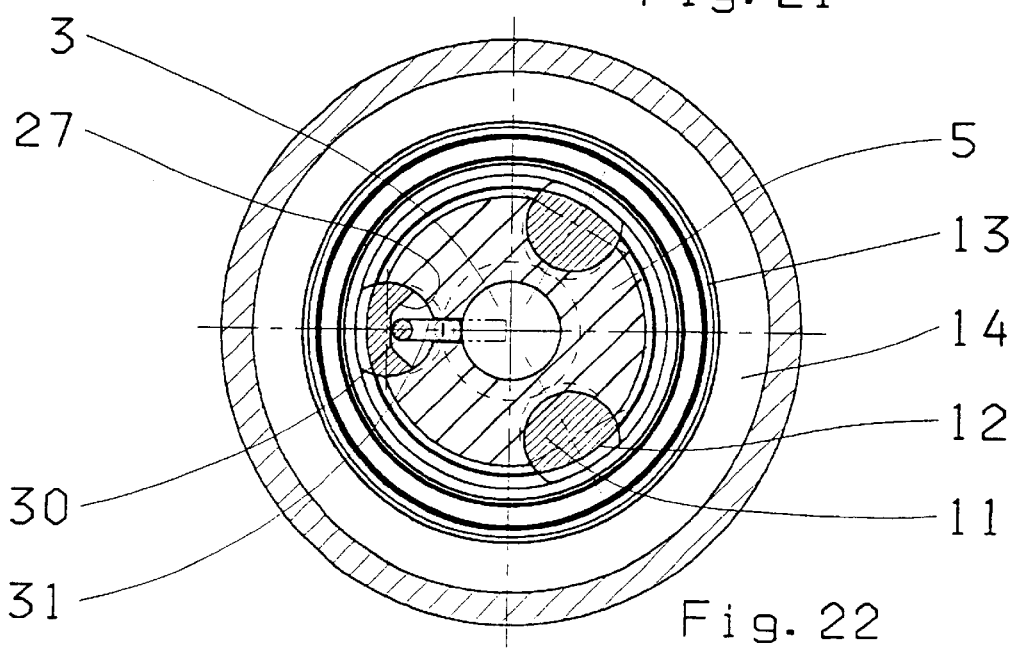
FIG. 22 is a section taken along line XXII—XXII of FIG. 21.

In FIGS. 17 through 20 one of the jaws 11 is formed with a longitudinally extending cam face 27 that engages a spring-loaded transversely displaceable blocking element 28 having a center orifice or aperture 29 alignable with the seat 3. When the jaws 11 are retracted as shown in FIG. 17 sufficiently to accommodate a bit shank of a size equal to or greater than that which can fit in the seat 3, the hole 29 is aligned with this seat 3. When the jaws 11 are advanced as shown in FIG. 19 to a setting corresponding to a tool shank small enough to fit in the seat 3, the locking element 28 is displaced and blocks the seat 3. Thus this system operates automatically, with no intentional user interaction. Similarly the arrangement of FIGS. 21 and 22 has a leaf spring 30 with an end 31 that is cammed by one of the jaws 11 from a solid-line freeing position into a dot-dash blocking position on forward movement of the jaws 11.

Figure 23:
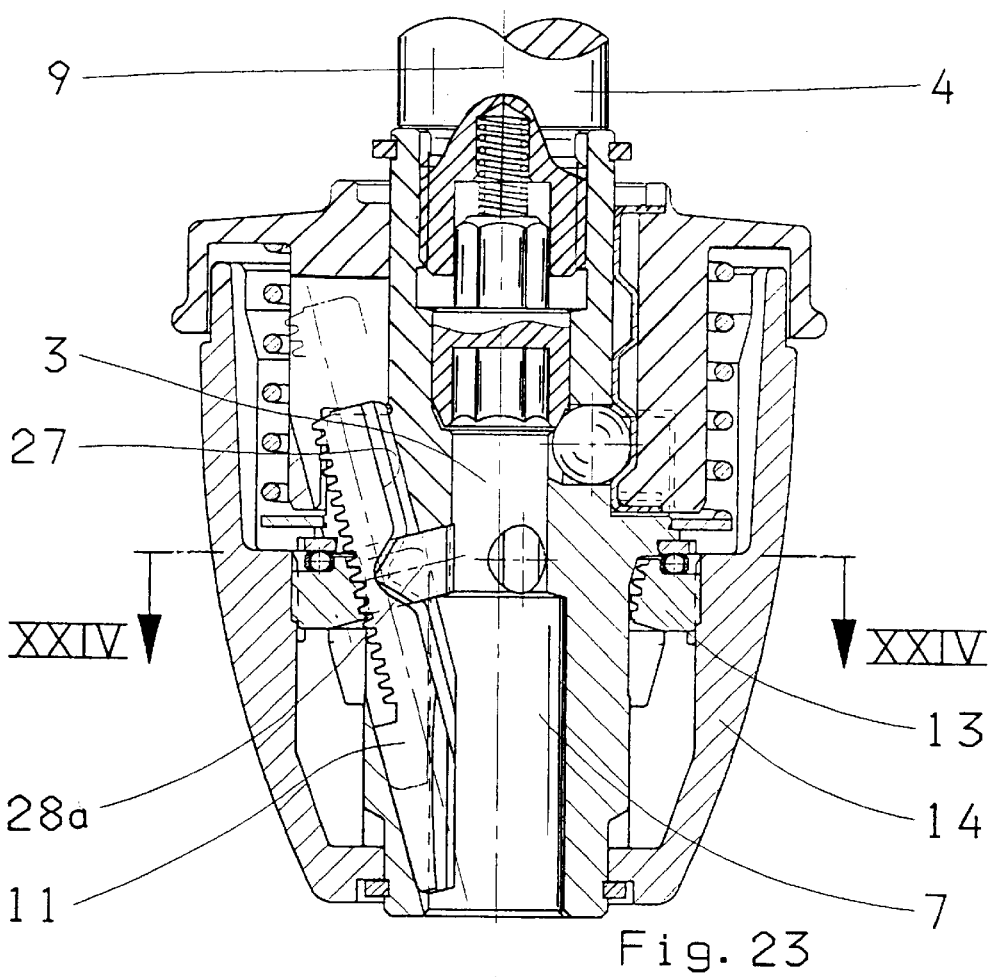
FIG. 23 is an axial section through a tenth embodiment of the chuck.
Figure 24:
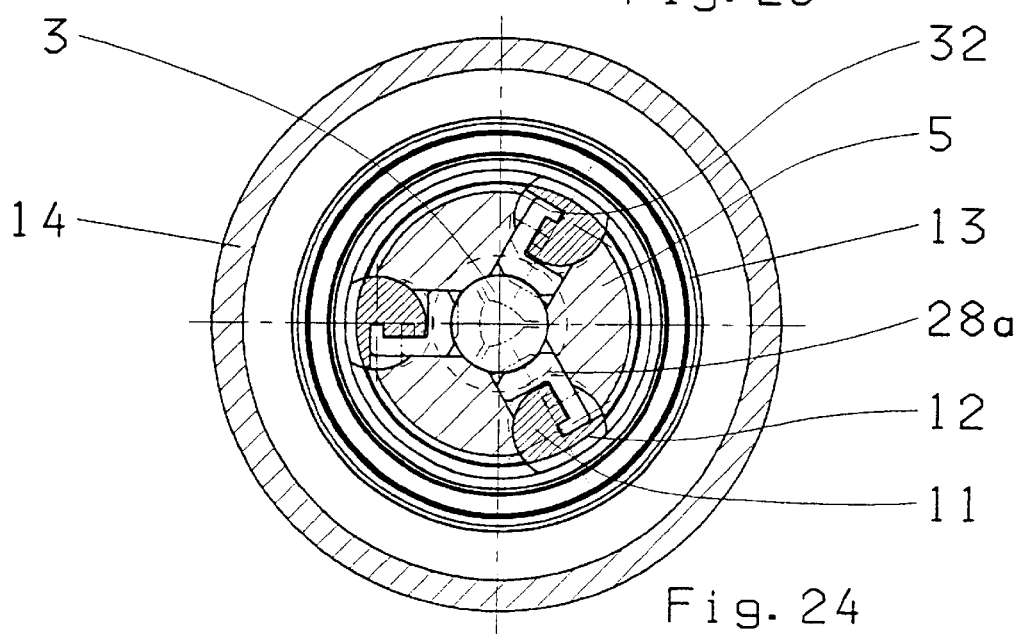
FIG. 24 is a section taken along line XXIV—XXIV of FIG. 23.
Figure 25:
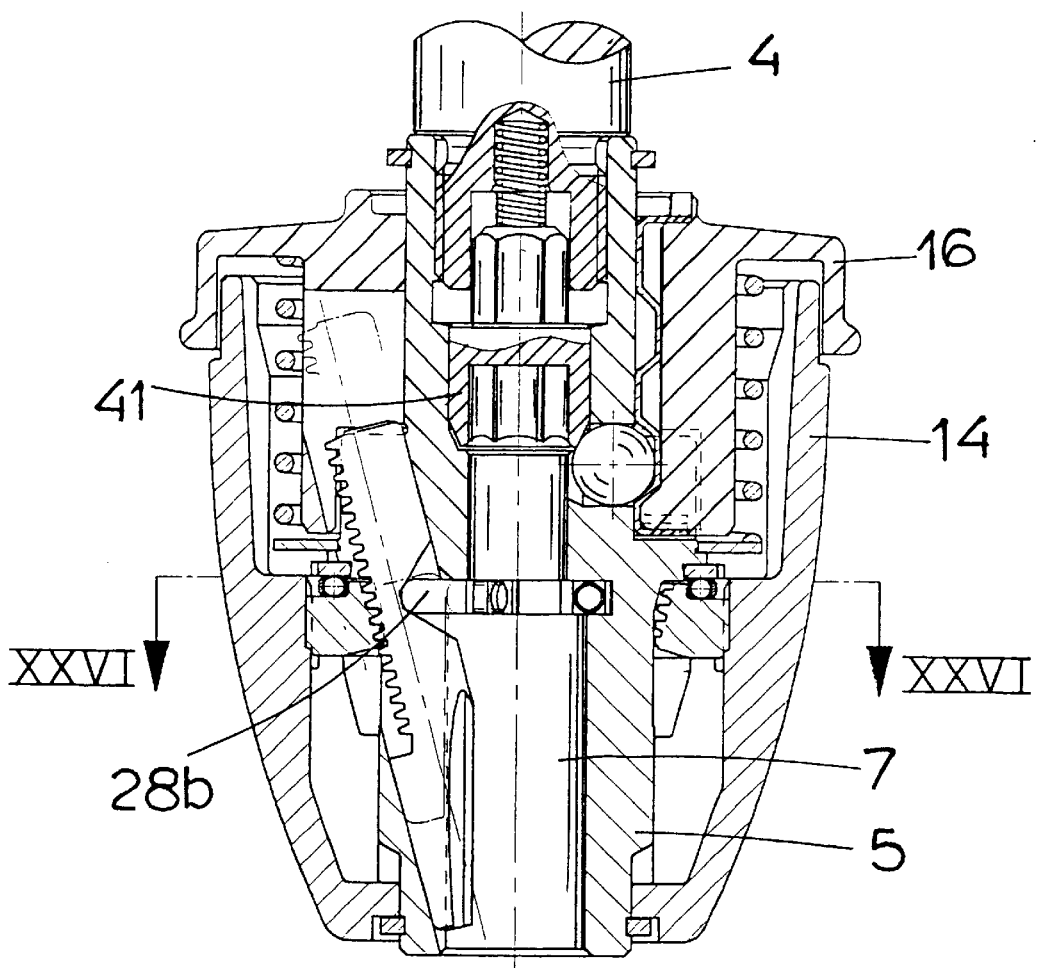
FIG. 25 is an axial section through an eleventh embodiment of the chuck.
Figure 26:
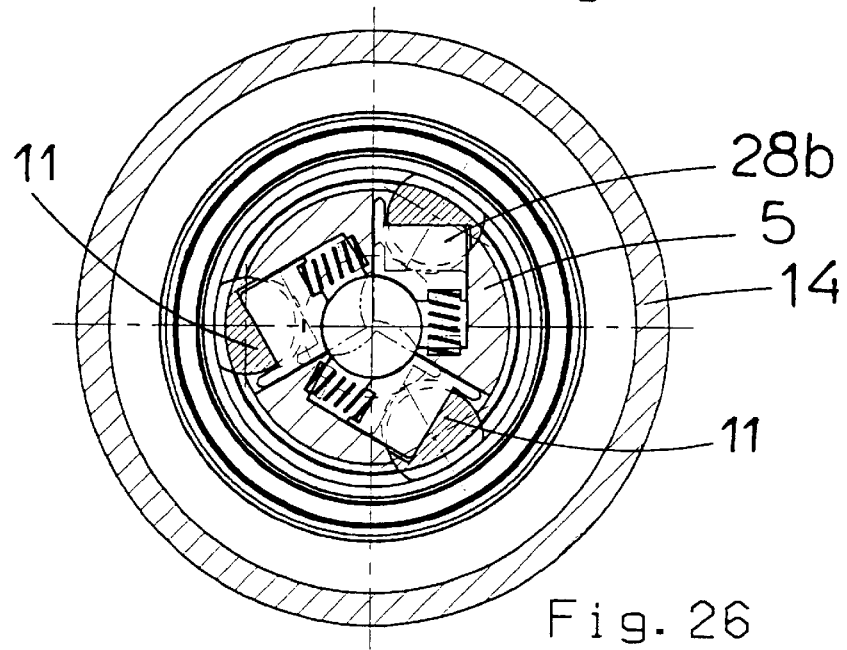
FIG. 26 is a section taken along line XXVI—XXVI of FIG. 11.

In FIGS. 23 and 24 each jaw 11 is coupled by an L-shaped entrainment formation 32 with a respective blocking element 28a. Thus no springs are needed as the elements 28a are positively coupled to the jaws 11 for synchronous movement therewith. A spring-loaded system with elements 28b is shown in FIGS. 25 and 26.

Figure 27:
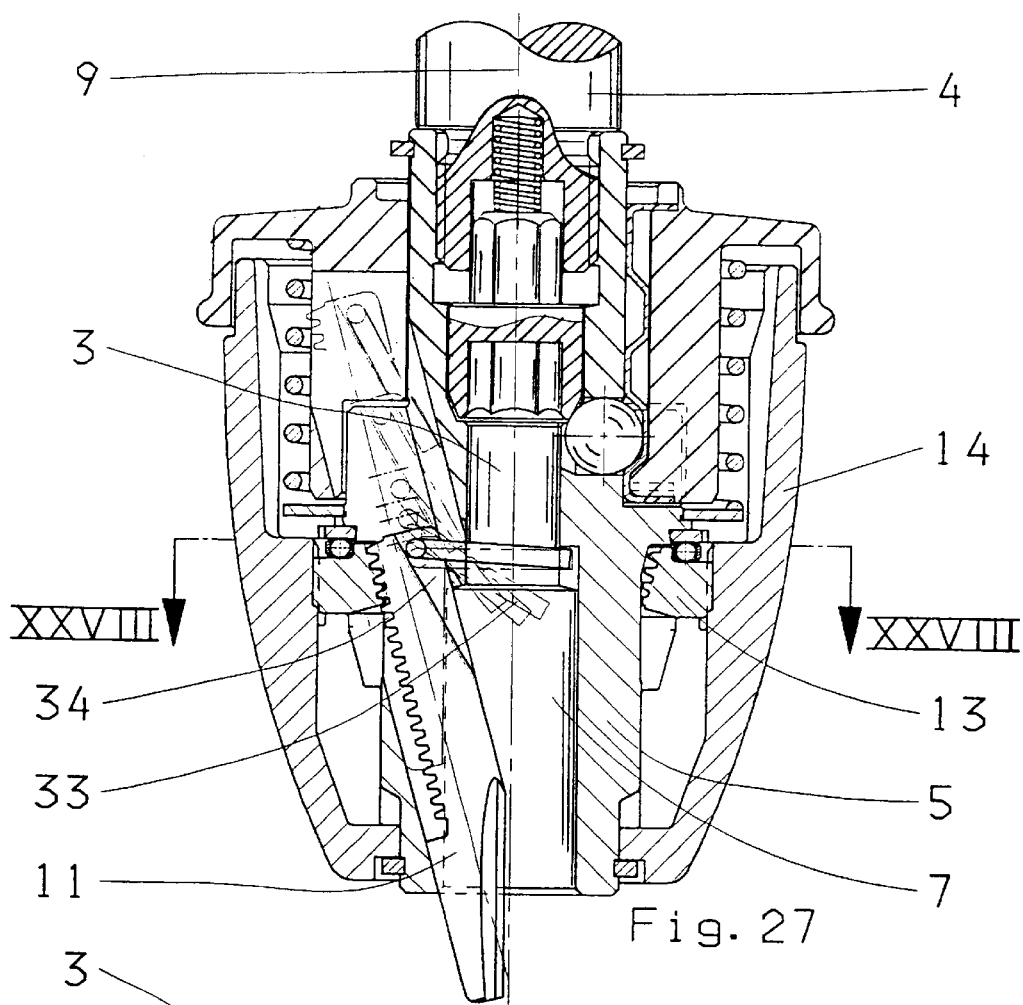
FIG. 27 is an axial section through a twelfth embodiment of the chuck.
Figure 28:
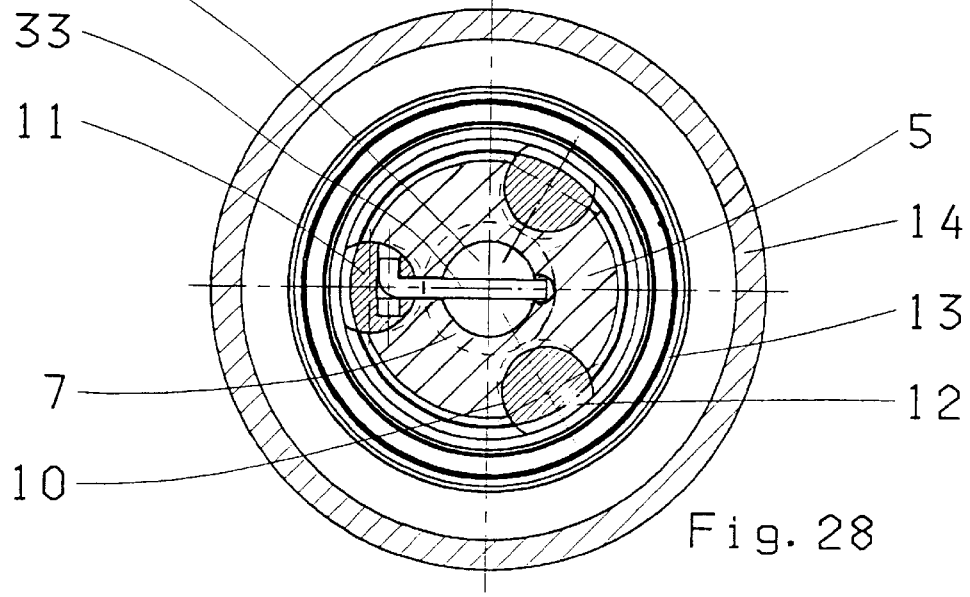
FIG. 28 is a section taken along line XXVIII—XXVIII of FIG. 27.

Finally, FIGS. 27 and 28 show how a blocking pin 33 carried on one of the jaws 11 can be recessed in a groove 34 in this jaw 11 but, when the jaw 11 is advanced, pokes out and projects across the mouth of the seat 3. The pin 33 is pre-stressed so as to tend to project across the axis 9 so it automatically swings out into the blocking position when the jaw 11 advances.

We claim:

1. A drill chuck comprising:
   a chuck body centered on an axis and forming an axially forwardly open bit-receiving recess;
   means forming at a base of the recess an axially forwardly open polygonal-section seat;
   a plurality of jaws spaced angularly around the recess forward of the seat;
   tightening means for displacing the jaws radially inward and outward, whereby the jaws can grip a bit in the recess;
   an element displaceable in the base of the recess between a blocking position in front of the polygonal-section seat and preventing entry of a bit thereinto and a freeing position clear of the seat and permitting entry of a bit thereinto; and
   actuating means on the chuck body for displacing the element between the blocking and freeing positions.

2. The drill chuck defined in claim 1 wherein the actuating means includes a ring rotatable about the axis on the chuck body, the element being a pin braced against the ring.

3. The drill chuck defined in claim 2 wherein the pin is generally radially displaceable in the chuck body.

4. The drill chuck defined in claim 3 wherein the ring has a cam surface against which the pin is braced.

5. The drill chuck defined in claim 4 wherein the cam surface has one end forming a seat in which the pin is engageable in the blocking position.

6. The drill chuck defined in claim 3, further comprising a spring urging the element against the surface and into the freeing position.

7. The drill chuck defined in claim 3 wherein there are a plurality of such pins angularly equispaced around the axis.

8. The drill chuck defined in claim 3 wherein the pin has a formation coupling it to one of the jaws for synchronous movement of the pin and the jaw.

9. The drill chuck defined in claim 1 wherein the element includes a lever pivoted about a lever axis on the chuck body.

10. The drill chuck defined in claim 9 wherein the element also includes a pin coupled to the lever and itself movable in front of the seat in the blocking position.

11. The drill chuck defined in claim 9 wherein the lever has an end movable in front of the seat in the blocking position.

12. The drill chuck defined in claim 9 wherein chuck body is formed with angled guides holding the jaws and the tightening means includes a ring rotatable about the axis on the body and having a screwthread meshing with the jaws, whereby rotation of the ring axially and radially displaces the jaws.

13. The drill chuck defined in claim 12 wherein one of the jaws is formed with a cam face engageable with the lever for displacing the lever end into the blocking position on axial advance of the one jaw past a predetermined position.

14. The drill chuck defined in claim 12 wherein the element is a plate slidable in the chuck body transverse to the axis and formed with an aperture aligned with the seat in the freeing position, one of the jaws being formed with a cam face engageable with the plate for displacing the aperture out of alignment with the seat on axial advance of the one jaw past a predetermined position.

15. The drill chuck defined in claim 14, further comprising a spring urging the plate against the face of the one jaw.

16. The drill chuck defined in claim 12 wherein the element is a leaf spring bearing elastically against one of the jaws and having an end displaceable in front of the seat on axial forward advance of the one jaw past a predetermined position.

17. The drill chuck defined in claim 1 wherein one of the jaws has a notch and the chuck further comprises a spring-biased element engageable in the notch when the jaw is in a predetermined position.

18. The drill chuck defined in claim 1 wherein a one of the jaws is formed with a cam surface engageable with the element to displace it between the blocking and freeing positions, the predetermined position corresponding to the blocking position of the element.

19. The drill chuck defined in claim 1 wherein the seat is formed in the chuck body.

20. The drill chuck defined in claim 1, further comprising a spindle fitted to the chuck body, the seat being carried on the spindle.

* * * * *